United States Patent
Daum et al.

(10) Patent No.: US 9,501,513 B2
(45) Date of Patent: Nov. 22, 2016

(54) ADVANCED CONCURRENCY MANAGEMENT IN ENTERPRISE SERVICE ORIENTED ARCHITECTURE BASED INTEGRATED BUSINESS PROCESSING OF DISTRIBUTED APPLICATION COMPONENTS

(75) Inventors: Andreas Daum, Heidelberg (DE);
Wolfgang Walter, Hambrucken (DE);
Moritz Thomas, Sandhausen (DE);
Jacek Zuber, Heidelberg (DE)

(73) Assignee: SAP SE, Walldorf (DE)

(*) Notice: Subject to any disclaimer, the term of this patent is extended or adjusted under 35 U.S.C. 154(b) by 972 days.

(21) Appl. No.: 11/848,063

(22) Filed: Aug. 30, 2007

(65) Prior Publication Data

US 2009/0063488 A1  Mar. 5, 2009

(51) Int. Cl.
*G06F 17/30* (2006.01)
*G06Q 10/00* (2012.01)

(52) U.S. Cl.
CPC ......... *G06F 17/30362* (2013.01); *G06Q 10/00* (2013.01)

(58) Field of Classification Search
CPC .... G06F 17/30362; G06F 9/526; G06F 9/52; G06F 17/30171; G06F 9/54; G06F 8/71; Y10S 707/99938; Y10S 707/99952; Y10S 707/99939; G05B 2219/24161; G05B 2219/24167
USPC ......... 709/225, 226, 217; 710/200; 707/704, 707/999.009, E17.007, 999.008; 726/2
See application file for complete search history.

(56) References Cited

U.S. PATENT DOCUMENTS

| | | | | |
|---|---|---|---|---|
| 5,459,871 A | * | 10/1995 | Van Den Berg | 718/104 |
| 6,499,031 B1 | * | 12/2002 | Hopmann | G06F 21/6218 |
| 6,973,549 B1 | * | 12/2005 | Testardi | 711/150 |
| 7,313,557 B1 | * | 12/2007 | Noveck | |
| 7,403,945 B2 | * | 7/2008 | Lin et al. | |
| 7,630,986 B1 | * | 12/2009 | Herz | G06Q 10/10 |
| 8,001,580 B1 | * | 8/2011 | Hyer et al. | 726/2 |
| 8,370,638 B2 | * | 2/2013 | Duane | G06F 21/31 380/249 |
| 8,410,898 B1 | * | 4/2013 | Vasquez | G07C 9/00571 340/5.1 |
| 8,566,298 B1 | * | 10/2013 | Nagaralu | G06F 17/30362 707/704 |
| 2003/0018785 A1 | * | 1/2003 | Eshel et al. | 709/226 |
| 2003/0110416 A1 | * | 6/2003 | Morrison et al. | 714/39 |
| 2003/0144980 A1 | * | 7/2003 | Holmgren | 707/1 |
| 2004/0221079 A1 | * | 11/2004 | Goldick | 710/200 |
| 2006/0101081 A1 | * | 5/2006 | Lin et al. | 707/200 |
| 2007/0143477 A1 | * | 6/2007 | Kaminsky et al. | 709/225 |
| 2008/0002696 A1 | * | 1/2008 | Claessens | H04L 63/102 370/392 |
| 2008/0082761 A1 | * | 4/2008 | Herness et al. | 711/152 |

* cited by examiner

*Primary Examiner* — Dennis Truong
(74) *Attorney, Agent, or Firm* — Brake Hughes Bellermann LLP

(57) ABSTRACT

A system and process that manages access to a resource in an enterprise service-oriented architecture environment. The system recognizes a master for each resource that has ultimate control over the respective resource. The master grants access to the resource though a lock system. If a system does not relinquish access to the resource, then the master is able to reclaim the lock to ensure the continued availability of the resource to all systems. This system ensures data coherency, while also improving performance by diminishing the amount of time a resource is unnecessarily locked and the time to obtain a lock.

20 Claims, 5 Drawing Sheets

ADVANCED CONCURRENCY MANAGEMENT IN ENTERPRISE SERVICE ORIENTED ARCHITECTURE BASED INTEGRATED BUSINESS PROCESSING OF DISTRIBUTED APPLICATION COMPONENTS

FIELD OF THE INVENTION

The invention relates to the management of access to shared resources. Specifically, the embodiments of the invention relate to a method and system for managing data consistency through a master lock system that controls access to shared resources.

BACKGROUND

Enterprise level applications share resources through the use of a cross system lock scheme. This scheme has been used in applications by SAP AG of Waldorf, Germany. For example, the cross system lock scheme was used in the SAP enterprise resource planning (ERP) 6.0 product. FIG. 1 is a diagram demonstrating the cross system lock scheme. The cross system lock scheme operates on a model of a 'network of equals,' where each system or application that gains control of a resource has the same rights to modify and utilize the resource. The cross system lock scheme requires that each participant be fully compatible with its protocol requirements including support for synchronous remote function calls (RFCs), and similar tight application coupling requirements involving double commit logic and character-based token structures that includes the application business key. These requirements restrict the use of the cross system lock scheme to fully compatible systems and exclude legacy systems from interoperability. Also, the cross system lock scheme has only a single document level for locking a resource. That is, the cross system lock scheme locks the document at the header level, such that an entire document is locked and only the holder of the key can modify any part of the document.

The illustration of FIG. 1 demonstrates the cross system lock scheme. In the illustrated example, the system 101 is seeking to gain control of a resource. The system 101 sends a request for control of the resource to the last known holder of the token the represents the authority to control and change the resource. The last known holder of the token for system 101 is system 103. However, the information of system 101 is out of date. System 103 no longer is in possession of the token. The token had previously been passed to system 105. System 103 then forwards the request of system 101 to system 105. The movement of the token in this manner and the imperfect information available to the systems in the cross system lock scheme can result in a long chain of message forwarding to get a request to the current holder of the token. This increases network communication and diminishes the resources of the intermediate systems that must pass on messages to the current token holder.

Once the request reaches the current holder of the token, the holder responds to the request depending on its current use of the resource. If the token holder is still utilizing the resource, then the request is denied and the token remains with the current token holding system 105. If the holder is no longer using the resource, then the request is accepted and the token is passed to the requesting service 101. However, if a system holding the token continues to use the resource (through normal operation or error of that system), then other systems are unable to gain access to that resource.

SUMMARY

Embodiments of the invention include a system and process that manages access to a resource in an enterprise service-oriented architecture environment. The system recognizes a master for each resource that has ultimate control over the respective resource. The master grants access to the resource though a lock system. If a system does not relinquish access to the resource, then the master is able to reclaim the lock to ensure the continued availability of the resource to all systems. This system ensures data coherency, while also improving performance by diminishing the amount of time a resource is unnecessarily locked and the time to obtain a lock.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 2:
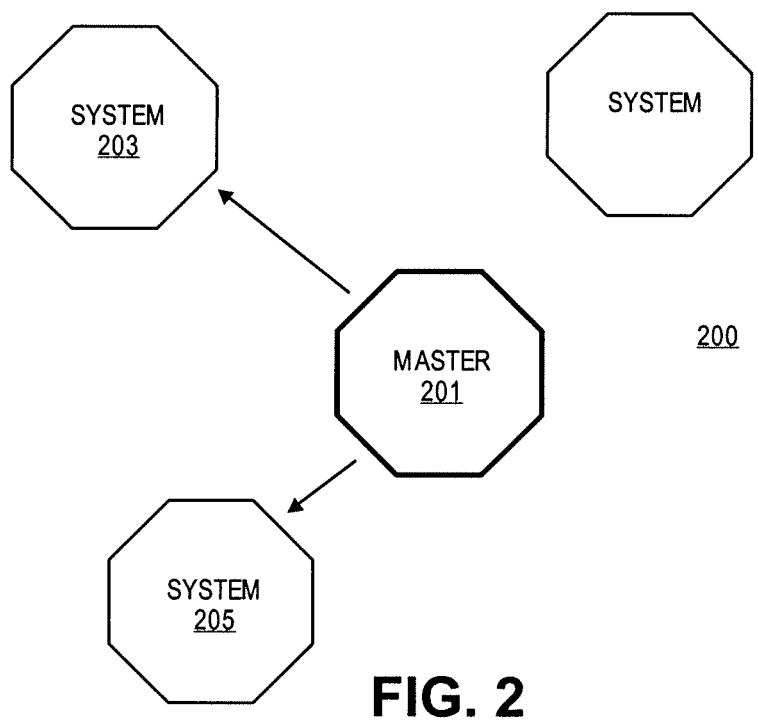
FIG. 2 is a diagram of one embodiment of an advanced concurrency management system.

FIG. 2 is a diagram of one embodiment of an advanced concurrency management system. The diagram illustrates a generalized embodiment of the advanced concurrency management system. The advanced concurrency management system can manage any number of systems and any number of resources. The advanced concurrency management system is compatible with a service-oriented architecture. The diagram and description provide an example embodiment with a single master providing a lock in a network with a small number or systems for sake of clarity. One skilled in the art would understand that the principles and techniques described in this context can be extended to larger networks including more resources, masters and systems.

In the example embodiment, a resource is governed by a master system 201. The master system 201 services requests for access to a resource. The resource can be any document, application, business logic, business object or similar resource. For example, the resource may be a transportation scheduling module or similar business logic or object that is shared amongst a number of systems in a service-oriented architecture. A single master governs a resource to provide clearly defined ownership of each resource. The master system 201 receives requests for access to the resource from other systems 203 in the network 200.

The master 201 can grant access to other systems by granting a lock or token of control to the other systems. The number of other systems granted control of a resource or a portion of a resource can depend on the type of resource and the type of access or degree of control granted. For example, multiple systems can be granted read access or a similar type of access to a resource. Only a single system at a time is granted control to modify the resource. However, modification authority of a resource can be granted at any level of granularity. For example, a whole document may be given to a system, a section of the document or a line of the document.

The master system 201 is able to restrict the amount of time that a requesting system can control the resource. The master system 201 may restrict the time of control through the use of a timeout mechanism or similar control mechanism. If a system does not release the resource during the allotted time period, then the master system 201 reclaims control by reclaiming the lock. The master system 201 notifies the system from which the resource is reclaimed. The master system 201 may also notify other systems that are waiting on the availability of the resource or may simply grant the lock to the next requesting system. The time period that a system may control a resource can be determined based on a default setting or an administrator setting. A requesting system can also specify a period of time at the time of request that the system requires the resource.

The master system 201 may accept or deny the request for the specific time period. The master system 201 may restrict a request for specific times within a determined range or set other requirements for obtaining a resource for specified time periods that establish the requesting system as a trusted system or similarly limit the use of such a request to minimize abuse. If the request for a specified time period is requested, then the master system starts a timeout operation for the requested time period and reclaims the lock if the requested time period is exceeded.

Requests for a resource can have multiple levels of granularity. The request can be for a resource at a document header level, item level, line level or similar levels of granularity. The grant of a lock at a higher level of a resource encompasses control of the lower levels. Locks of varying levels of granularity or multiple locks at the same level of granularity can be granted to different requesting systems if the requests do not result in an overlap of coverage of the requested resource, such that a data inconsistency can result from modification of the resource. Each resource may be manipulated as a copy of the original. The copies cannot be used to modify an original resource unless the author of the change holds the control over the requisite portion of the resource.

In one embodiment, a locking key for a granted lock on a resource is based on an identifier supplied by the requesting system. The identifier may be a universal unique identifier (UUID) or similar identifier. The UUID is a component of enterprise service-oriented architecture messaging. The UUID is utilized by the master system 201 to generate a key and after the lock is granted only messages with the locking key UUID are able to modify the resource. At the time that a lock is granted, the information about the lock is stored in a persistent database of the master system 201 together with the UUID locking key. All internal change requests that are requests from components within the master system 201, as well as, all external change requests from other systems will be denied unless those change requests are accompanied with the correct UUID locking key in the message. The UUID locking key then serves as an authentication for allowing changes to the resource.

A UUID can be generated using any algorithm or naming convention including time based, name based, pseudo random or similar algorithm for determining a UUID. The UUID can be a 128 bit identifier in compliance with RFC 4122 or similar standards. Many legacy systems include support for UUID or may be utilized or modified such that a UUID can be incorporated into them easily or added to them easily. In other embodiments, any type of identifier such as a uniform resource locator (URL) could be used to signify operational success. The unique identifier can be any value, string or similar data format.

Figure 3:
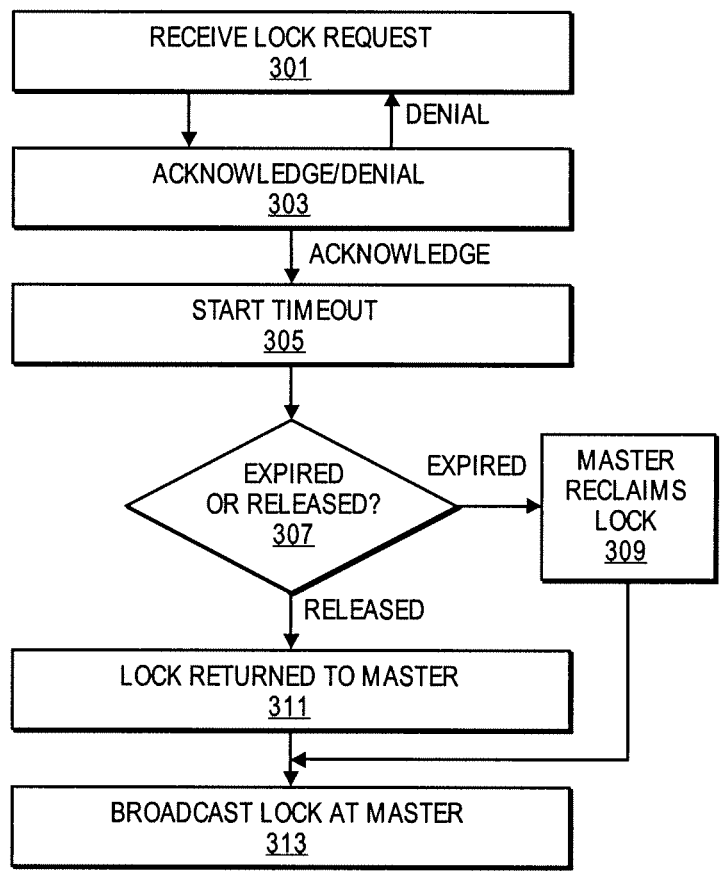
FIG. 3 is a flowchart of one embodiment of a process for managing lock requests.

FIG. 3 is a flowchart of one embodiment of a process for managing lock requests. The process of managing lock requests is implemented by the master system. The process is initiated upon receipt by the master system of a request for control of a resource, such as a business logic, application, data source or similar resource from another system (block 301). The master system analyzes the request and checks the current status of the requested resource to determine whether a lock can be granted for the requested resource. If the resource is not currently locked and the request meets any criteria specified by a system administrator, such as a requested time period falling with a specified range, valid UUID supplied, trusted requesting system or similar characteristics, then a locking key is generated based on the UUID associated with the request and an acknowledgment message is returned to the requesting device (block 303). The UUID and key information of the requesting system is stored in a database or storage module in communication with the master system.

If the lock is not available, the request is not accompanied by a UUID, the request does not properly specify a valid requested time or a similar set of criteria is not met or some other error occurs in the request, then a denial message may be returned to the requesting system. In another embodiment, no message is returned to the requesting system. The master system then awaits the next request message to be received for processing.

If the lock is granted, then the master system starts a timeout process (block 305). The timeout duration may be a default length of time, an administrator specified length of time or a time period specified by the requesting system. The timeout process can have any duration. The master system may restrict acceptable requested time periods to be within a defined range. The range can be a default range or administrator defined range. The time out period can be specified in terms of a start or end time, number of units of time or similarly specified. The received or specified duration can be stored along with the lock and key information. The master lock executes the timeout process until the timeout expires or a release message is received from the system holding the lock (block 307). If the timeout process expires, then the master system reclaims the lock (block 309). The master system updates the data storage to indicate that the master is the lock holder and no longer recognizes the key of the system that was holding the lock. In one embodiment, the master system broadcasts or sends messages to the system that held the lock to indicate that the lock was reclaimed. In another embodiment, other systems in the network may also be notified that the lock is available again and that it is held by the master system (block 313). Requests from other systems can be serviced as they are received, queued or similarly handled. Any selection scheme can be utilized to select the next request to process if multiple requests are received.

If a release message is received within the selected time period of the timeout process, then the master updates its database files to indicate that the master system is again in control of the lock (block 311). In one embodiment, the master system then broadcasts or notifies other systems that the master system has the lock and it is available (block 313). In another embodiment, the master system does not advertise lock ability and only provides lock availability information in response to a request for the lock.

Figure 4A:
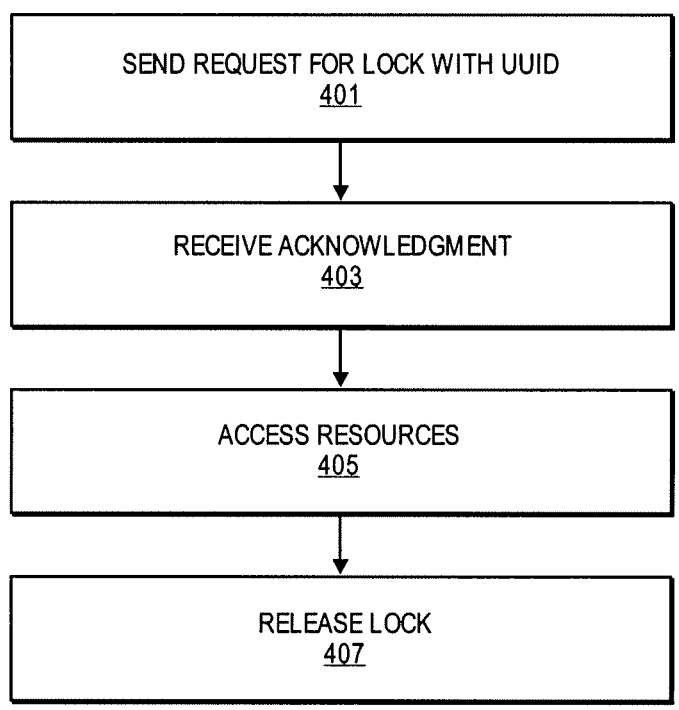
FIG. 4A is a flowchart of one embodiment of a process for making lock requests.

FIG. 4A is a flowchart of one embodiment of a process for making lock requests. The process of generating a lock request is executed by a system that requires a resource. The requesting system may generate a request message based on a need of an application for a resource such as a business object, business logic, data file or similar resources (block 401). The request message includes an identifier such as a UUID or similar identifier that identifies the source of the request. If the request is granted, then the system receives an acknowledgement message from the master system (block 403). If the request is denied, then either no message is returned and the request may be resent after a timeout period or similar mechanism indicates that the request failed.

After receiving the access acknowledgement, then the application or component of the system that needs to utilize the requested resource can commence accessing or modification of the resource (block 405). The system holding the lock may have a local copy of a resource and requests to modify the resource are necessary to update the resource. The lock allows the shared resource to be updated in a coherent fashion, preventing multiple systems from modifying the resource while the others are utilizing it, thereby creating a controlled environment that ensure data coherency and system stability.

Each requested access to the resource is accompanied by the UUID or similar identifier that serves as a portion of a locking key that is utilized to authenticate modification requests and similar requests that originate from the system holding the lock. After completion of the required accesses and modifications then a release message or similar message is sent to the master system (block 407). If at any point during the access phase (block 405) a message is received from the master system that the key has been reclaimed, then the access phase is ended and if necessary another request for the lock is made.

Figure 4B:
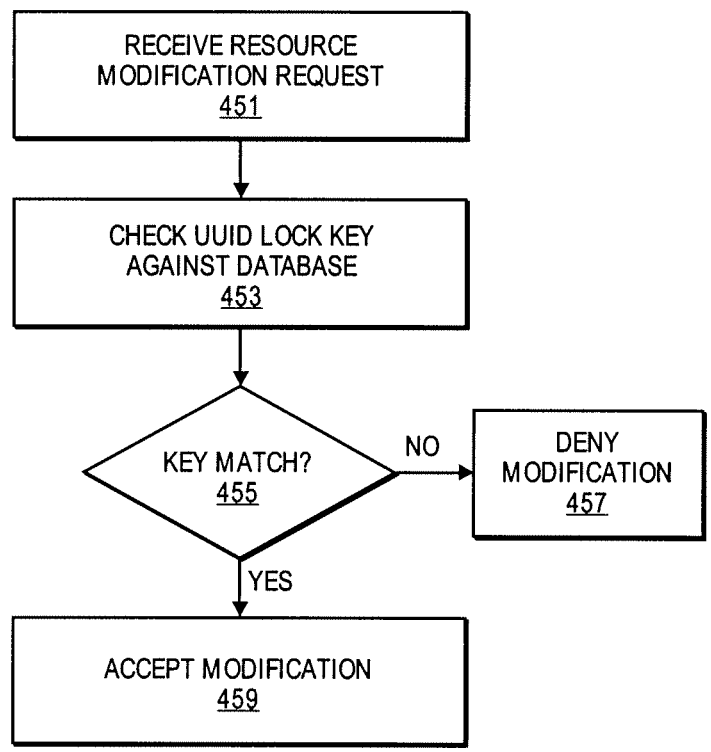
FIG. 4B is a flowchart of one embodiment of a process for managing requests for a business resource.

FIG. 4B is a flowchart of one embodiment of a process for managing requests for a resource. The master system receives requests from other systems for access and/or the ability to modify a resource (block 451). Each request is checked to authenticate the access to the resource is by the lock holder (block 453). The authentication process compares the UUID or similar identifier in the access or modification message to determine if it matches a stored lock key or is used to generate a lock key to compare to the stored lock key. Any verification or authentication process can be utilized and any key system can be employed that allows the use of a UUID or similar identifier as a key or partial key such as a public key.

If a received key matches the stored key, then modifications and access to the resource specified in the associated message are granted or confirmed (block 459). If the received key does not match the key stored by the master system, then the modification or access specified in the associated message is denied (block 457). This lock request management process may be executed by the master system for each request received until a lock is released. If a lock is held by the master system, then all external modification requests may be denied until the lock is granted to another system. Internal requests from applications and programs within the master system can be granted. In another embodiment, any request to modify the resource is treated as a request for the lock for the system automatically. In this embodiment, no specialized request message for the lock is needed.

Figure 1:
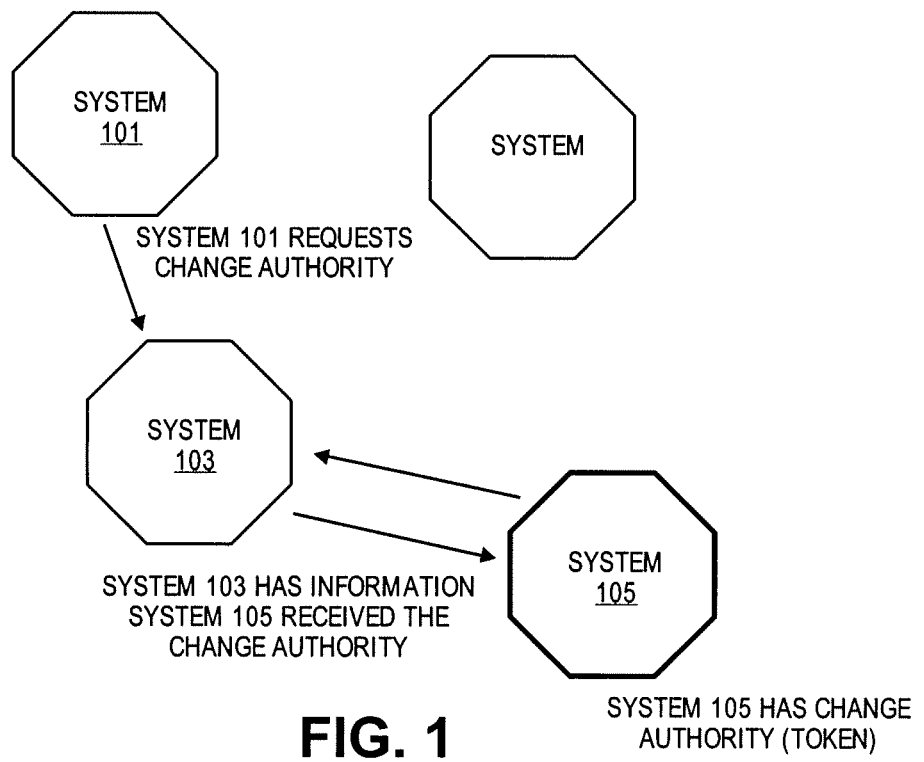
FIG. 1 is a diagram of a cross system lock.
Figure 5:
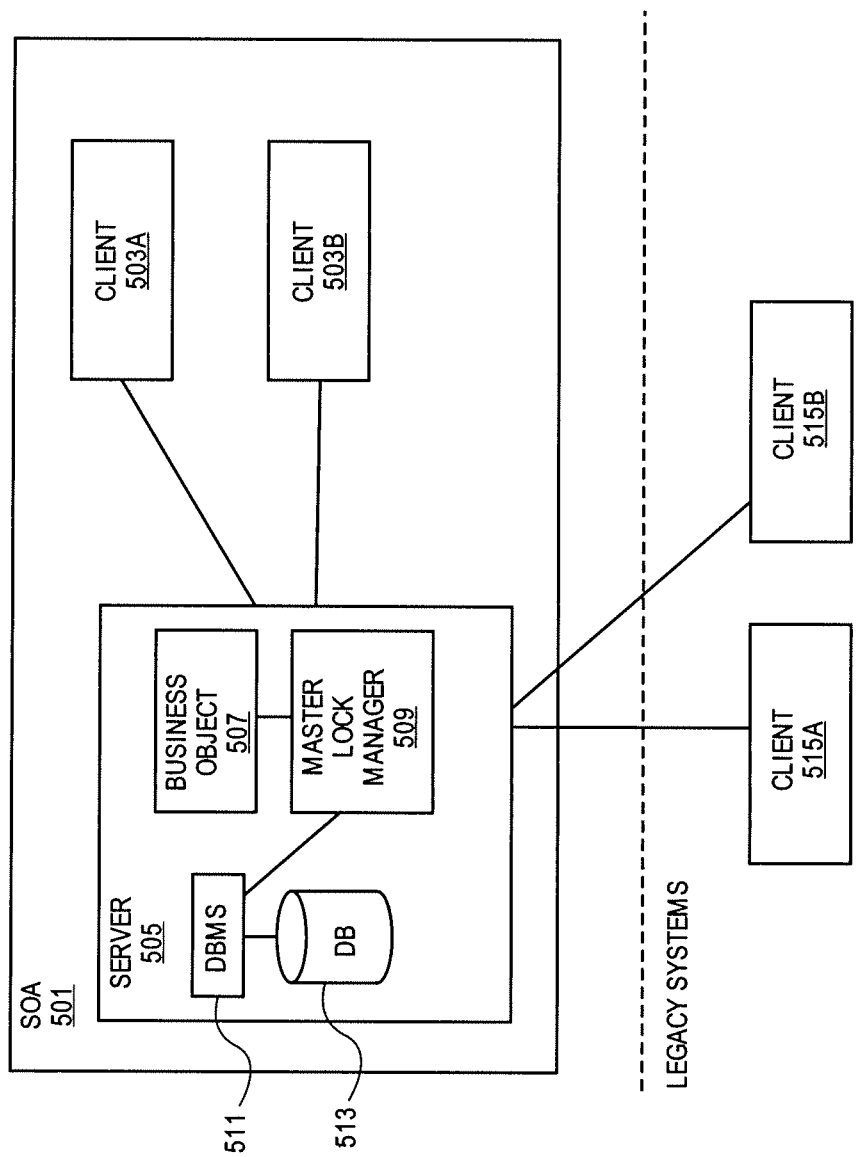
FIG. 5 is a diagram of one embodiment of an advanced concurrency management system in a service-oriented architecture.

FIG. 5 is a diagram of one embodiment of an advanced concurrency management system in a service-oriented architecture. This example embodiment is a more specific example than that given in FIG. 1. One skilled in the art would understand that this further example is given for illustrative purposes and does not limit the claims in the application to this specific embodiment. Rather, the embodiment serves to further clarify that which is within the spirit and scope of the invention.

The advanced concurrency management system is implemented in the context of a service-oriented architecture 501 framework. The service-oriented architecture 501 provides a distributed network environment that provides modular business logic that is presented as a service to clients. This includes a messaging system that facilitates inter-application communication. The messaging utilizes UUIDs to identify the originating application or system for each message.

In one embodiment, a server 505 provides a resource such as a business object, such as a transportation schedule module in a supply chain management system that is utilized by a set of clients 503A,B, 515A,B. These clients may be applications 503A, B within the service oriented architecture 501 as well as legacy applications and systems 515 A,B that are not part of the service-oriented architecture 501. These legacy systems 515A,B are still able to communicate with the server 505 to obtain and utilize the business object 507, because the locking system is asynchronous, is not stateful and utilizes a widely utilized UUID as a locking key. This makes it simple to interface legacy systems or modify the legacy systems to make them compatible with the advanced concurrency management system.

A master lock manager 509 services requests for access to the business object including the granting of locks and the authentication of modification requests after a lock has been granted. The master lock manager 509 stores UUID information when a lock is granted into a database 513 through a database management system 511. This data is retrieved to authenticate requests to modify the business object 507. If a match is not found between UUID based key information and a UUID derived key from a received message, then no modification of the business object is allowed. The master lock also reclaims locks after a timeout period has expired ensuring that a business object remains accessible to all other clients of the server.

In one embodiment, the advanced concurrency management system may be implemented as hardware devices. In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
receiving a request for a lock to a resource in a service-oriented architecture from a first system of a plurality of independent systems, the request including a universal unique identifier (UUID) that is unique within the plurality of independent systems, wherein the UUID identifies a source of the request;
granting the lock without a specified duration to the first system, the lock granted with a specified level of granularity for the resource, wherein the specified level of granularity can be selected by a lock master to be any of at least a header level granularity, an item level granularity, and line level granularity, and wherein a selected higher level of granularity encompasses one or more lower levels of granularity;
generating a key to the lock by using the UUID to generate the key, wherein the key is used in requests for modification of the resource; and
broadcasting a release of the lock to all systems of the plurality of independent systems.

2. The method of claim 1, further comprising:
returning an acknowledgement of the request to the first system indicating the lock has been granted.

3. The method of claim 1, further comprising:
denying a request from a second system for the lock upon determining a UUID of the second system does not result in a match of the key.

4. The method of claim 1, further comprising:
starting a timeout process upon granting the request; and
reclaiming the lock from the first system upon expiration of the timeout.

5. The method of claim 1, wherein the request includes an indicator of a length of time for using the resource.

6. The method of claim 1, further comprising:
receiving a release message from the first system; and
releasing the lock in response to the release message.

7. The method of claim 4, further comprising:
reclaiming the lock by a master system in response to an expiration of the timeout process.

8. The method of claim 1, wherein processing of each request for the lock is asynchronous.

9. The method of claim 1, further comprising:
broadcasting that the lock has been reclaimed by a master system.

10. The method of claim 1, wherein the resource is a business object.

11. A non-transitory machine readable medium having instructions stored therein, which when executed, cause a machine to perform a set of operations comprising:
receiving a first request from a first system of a plurality of independent systems for a lock to a business object in service-oriented architecture, wherein the first request includes an identifier that uniquely identifies a source of the first request;
granting the lock without a specified duration to a requestor, the lock granted with a specified level of granularity for a requested resource, wherein the specified level of granularity can be selected to be any of at least a header level granularity, an item level granularity, and line level granularity, and wherein a selected higher level of granularity encompasses one or more lower levels of granularity;
generating a key to the lock by using the identifier of the first request to generate the key, wherein the key is used in requests for modification of the requested resource;
sending the lock and the key to the requester; and
broadcasting a notification that the lock is available to all systems of the plurality upon receiving the release of the lock.

12. The machine readable medium of claim 11 having instructions stored therein, which when executed, cause a machine to perform a set of operations further comprising:
receiving a second request;
checking availability of the lock based on a comparison of an identifier of the second request and the identifier of the first request; and
returning a denial of the request if the lock is not available.

13. The machine readable medium of claim 11 having instructions stored therein, which when executed, cause a machine to perform a set of operations further comprising:
storing a lock request duration received in the first request.

14. The machine readable medium of claim 13 having instructions stored therein, which when executed, cause a machine to perform a set of operations further comprising:
determining expiration of the lock request duration; and
reclaiming the lock at expiration of the lock request duration.

15. The machine readable medium of claim 11 having instructions stored therein, which when executed, cause a machine to perform a set of operations further comprising:
broadcasting a change in an availability of the lock.

16. The machine readable medium of claim 11, wherein processing of lock requests is asynchronous.

17. The machine readable medium of claim 11, wherein the identifier is a universal unique identifier (UUID).

18. A system comprising:
a processor;
a business object representing a business resource in a service-oriented architecture; and
a master lock component to manage access to the business object in response to a request for access by a system to the business object, the master lock component to supply a lock without a specified duration having a key generated using a universal unique identifier (UUID) of the system, the UUID identifying a source of the request and the UUID supplied as part of the request and is unique within the service oriented architecture, the key used in requests for modification of the business object, the lock supplied with a specified level of granularity for the business object, wherein the specified level of granularity can be selected by the master lock component to be any of at least a header level granularity, an item level granularity, and line level granularity, wherein a selected higher level of granularity encompasses one more lower levels of granularity, and wherein the master lock component broadcasts a notification that the lock is available to all listening business objects upon receiving the release of the lock.

19. The system of claim 18, wherein the lock is specific to a UUID of the request.

20. The system of claim 18, wherein the master lock component reclaims control of the business object upon detecting a timeout condition specified by the request.

* * * * *